(12) United States Patent
Martin et al.

(10) Patent No.: US 9,613,013 B2
(45) Date of Patent: Apr. 4, 2017

(54) DEVICE, METHOD AND SYSTEM FOR DISPLAYING A FIRST PAGE OF A DIGITAL EDITION BY EFFICIENT DOWNLOAD OF ASSETS

(71) Applicant: LA PRESSE, LTÉE, Montréal (CA)

(72) Inventors: Mathieu Martin, St-Bruno-de-Montarville (CA); Simon Audet, Québec (CA); George Zreik, McMasterville (CA); Jean-Marc De Jonghe, Montréal (CA); Nicolas Poncet, Montréal (CA); Gulam Moledina, LaSalle (CA); Jurgen Karir, Montréal (CA); Ian Cloutier, Montréal (CA)

(73) Assignee: NUGLIF INC., Montreal, Quebec (CA)

( * ) Notice: Subject to any disclaimer, the term of this patent is extended or adjusted under 35 U.S.C. 154(b) by 0 days.

(21) Appl. No.: 14/413,379

(22) PCT Filed: Jan. 10, 2014

(86) PCT No.: PCT/CA2014/050014
§ 371 (c)(1),
(2) Date: Jan. 7, 2015

(87) PCT Pub. No.: WO2014/107809
PCT Pub. Date: Jul. 17, 2014

(65) Prior Publication Data
US 2015/0169516 A1 Jun. 18, 2015

Related U.S. Application Data

(60) Provisional application No. 61/751,518, filed on Jan. 11, 2013.

(51) Int. Cl.
*G06F 17/22* (2006.01)

(52) U.S. Cl.
CPC ...... *G06F 17/2288* (2013.01); *G06F 17/2229* (2013.01)

(58) Field of Classification Search
CPC .................................................... G06F 17/22
See application file for complete search history.

(56) References Cited

U.S. PATENT DOCUMENTS 6,618,758 B1 * 9/2003 Ubowski ........... G06F 17/30893
707/999.001
6,895,169 B1 * 5/2005 Sprague ................. H04N 5/765
348/461

(Continued)

FOREIGN PATENT DOCUMENTS

EP 0870 246 B1 6/2007
WO WO 00/02143 1/2000

OTHER PUBLICATIONS http://www.hd-trailers.net/movie/battle-los-angeles/, Mar. 18, 2011, pp. 1-2.*

(Continued)

*Primary Examiner* — Scott Baderman
*Assistant Examiner* — Sookil Lee
(74) *Attorney, Agent, or Firm* — Brinks Gilson & Lione

(57) ABSTRACT

A processor-implemented method for displaying a digital edition is provided. The digital edition is readable by a dedicated software application running on a data processing device, such as an electronic tablet. The method allows opening the digital edition, such as a daily newspaper, even though the edition is not completely downloaded on the data processing device. The digital edition comprises a compiled file including a structure of the edition, and a list of minimal assets located on a remote storage and required to open the edition. A processing device configured to perform the (Continued)

method is also provided, as well as a backend system to generate the digital edition files.

18 Claims, 11 Drawing Sheets

(56) References Cited

U.S. PATENT DOCUMENTS

| | | | |
|---|---|---|---|
| 7,747,970 B2 | 6/2010 | Sanchez et al. | |
| 7,865,567 B1 | 1/2011 | Hendricks et al. | |
| 8,131,093 B2 | 3/2012 | Kim | |
| 8,209,623 B2 | 6/2012 | Barletta et al. | |
| 8,477,331 B2 | 7/2013 | Wei et al. | |
| 8,554,640 B1* | 10/2013 | Dykstra | G06Q 10/101 705/14.49 |
| 8,655,858 B1* | 2/2014 | Chidambaram | G06Q 10/10 707/695 |
| 2002/0078165 A1* | 6/2002 | Genty | G06F 17/30902 709/217 |
| 2002/0111970 A1 | 8/2002 | Saito et al. | |
| 2003/0163444 A1* | 8/2003 | Kotzin | G06F 17/30902 |
| 2004/0021673 A1 | 2/2004 | Alessi et al. | |
| 2008/0271095 A1 | 10/2008 | Shafton | |
| 2009/0070252 A1* | 3/2009 | Bartels | G06Q 40/04 705/37 |
| 2010/0088293 A1* | 4/2010 | Daigle | G06F 17/30053 707/705 |
| 2010/0100829 A1* | 4/2010 | Laberge et al. | 715/762 |
| 2011/0032183 A1 | 2/2011 | Murphey | |
| 2011/0078030 A1* | 3/2011 | Borst | G06Q 30/02 705/14.73 |
| 2011/0173188 A1 | 7/2011 | Walsh et al. | |
| 2011/0225156 A1* | 9/2011 | Pavlik | 707/737 |
| 2011/0289419 A1* | 11/2011 | Yu et al. | 715/738 |
| 2012/0084405 A1* | 4/2012 | McQuarrie | G06F 17/30011 709/219 |
| 2012/0089648 A1* | 4/2012 | Kozan | 707/802 |
| 2012/0096094 A1 | 4/2012 | So et al. | |
| 2012/0331377 A1 | 12/2012 | Howell et al. | |
| 2013/0080895 A1* | 3/2013 | Rossman et al. | 715/720 |
| 2013/0117665 A1* | 5/2013 | Tagliaferri | G06F 17/24 715/255 |
| 2013/0139052 A1 | 5/2013 | Rong et al. | |
| 2013/0144928 A1* | 6/2013 | Gittelman | G06F 17/30899 709/201 |
| 2014/0095988 A1* | 4/2014 | Pegg | G06F 17/217 715/251 |
| 2014/0115449 A1* | 4/2014 | Migos | G06F 17/2229 715/251 |
| 2014/0171179 A1* | 6/2014 | Ball | G07F 17/32 463/25 |
| 2014/0173644 A1* | 6/2014 | Ball | H04N 21/4826 725/14 |
| 2014/0304576 A1* | 10/2014 | Walton | 715/201 |
| 2014/0304577 A1* | 10/2014 | St. Pierre et al. | 715/201 |

OTHER PUBLICATIONS

International Search Report, International Application No. PCT/CA2014/050014, Mar. 19, 2014, 14 pages.
International Preliminary Report on Patentability, International Application No. PCT/CA2014/050014, Nov. 27, 2014, 5 pages.
European Search Report for Application No. 14737832.7-1901—PCT/CA2014050014, dated Jan. 5, 2016, pp. 1-8.

* cited by examiner

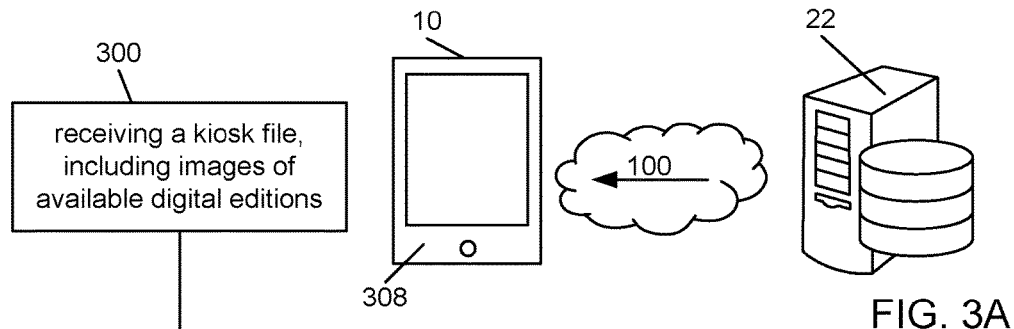
FIG. 3A
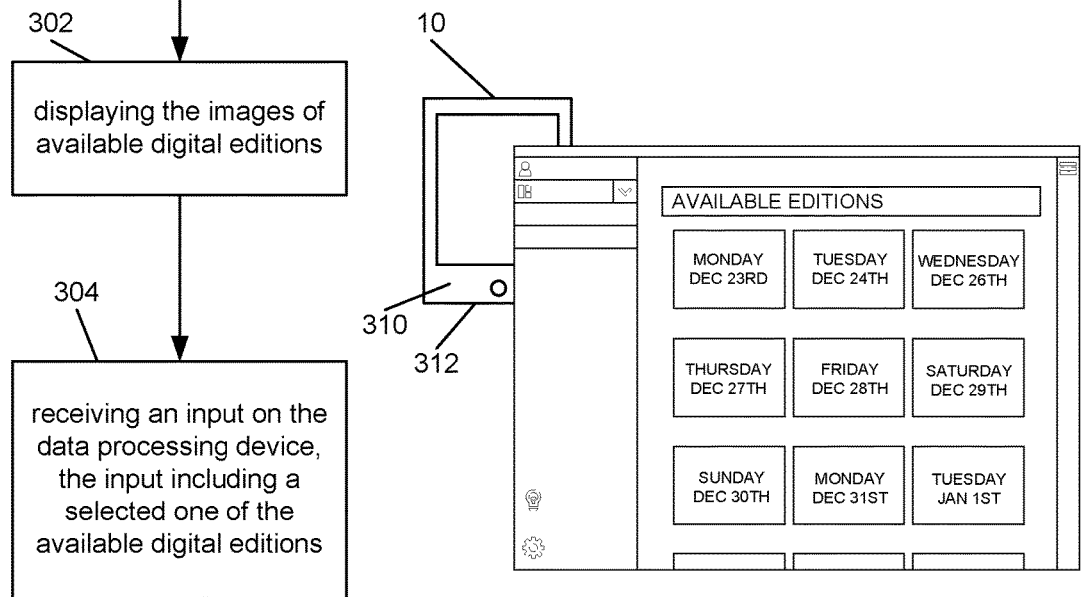
FIG. 3B
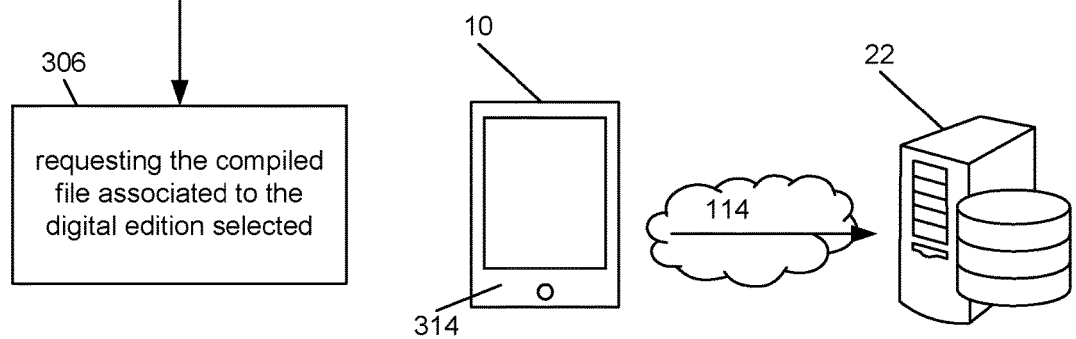
FIG. 3
FIG. 3C

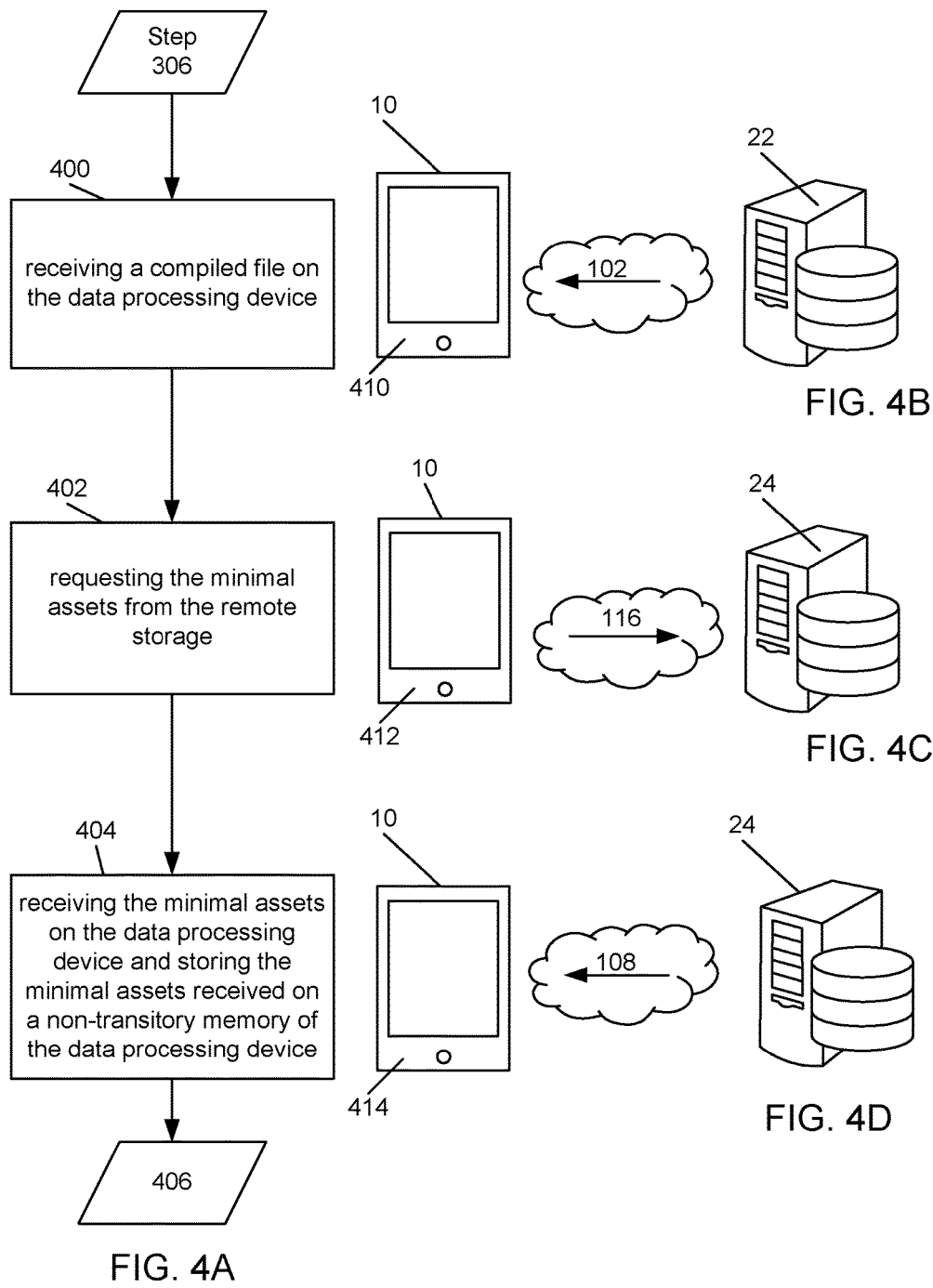

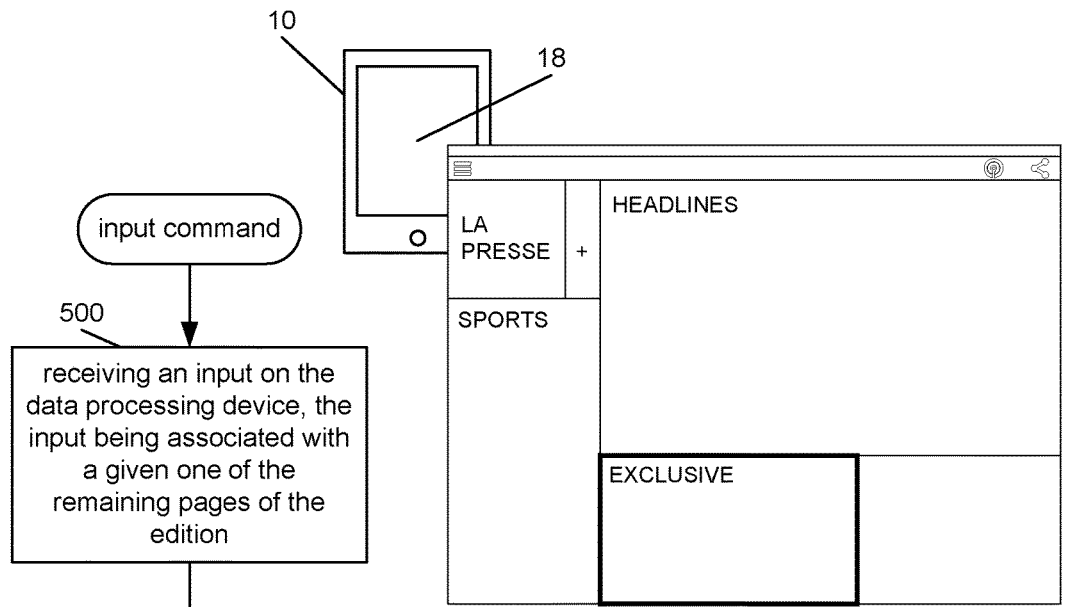
FIG. 5A
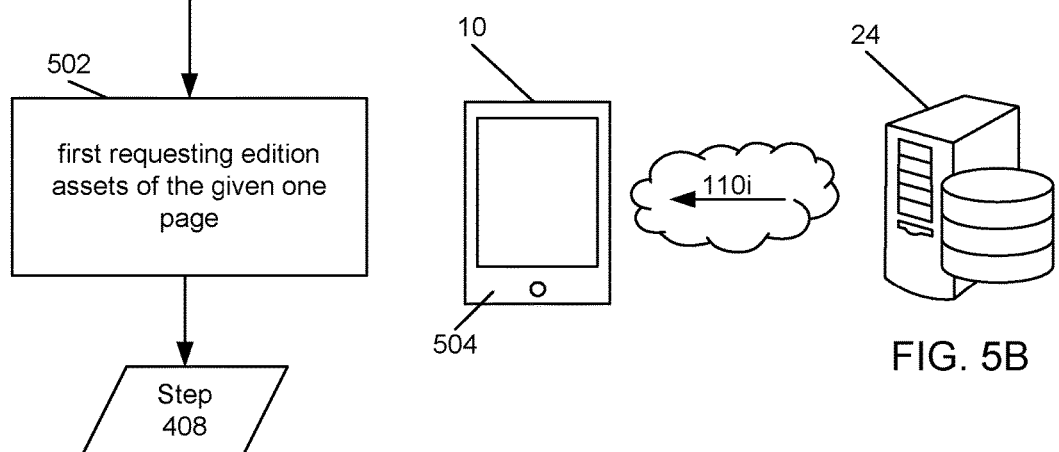
FIG. 5B
FIG. 5

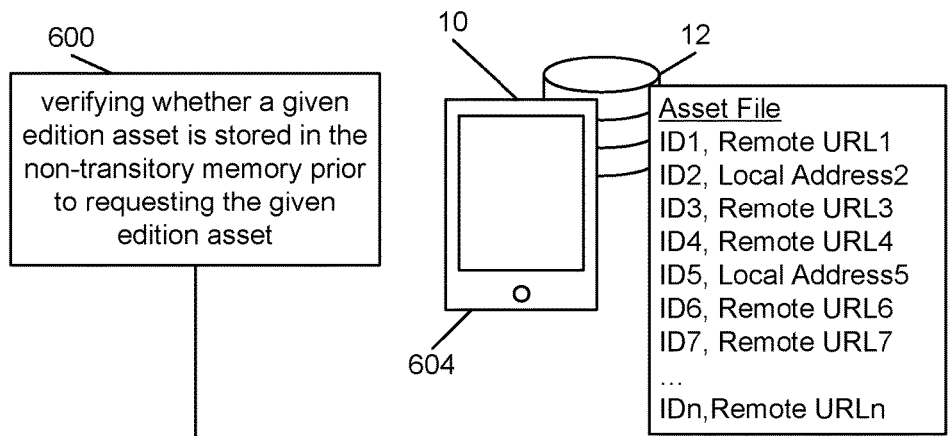
FIG. 6A
600 verifying whether a given edition asset is stored in the non-transitory memory prior to requesting the given edition asset
602 requesting the given edition asset from the remote storage only if the edition asset is not already stored in the non-transitory memory.
FIG. 6
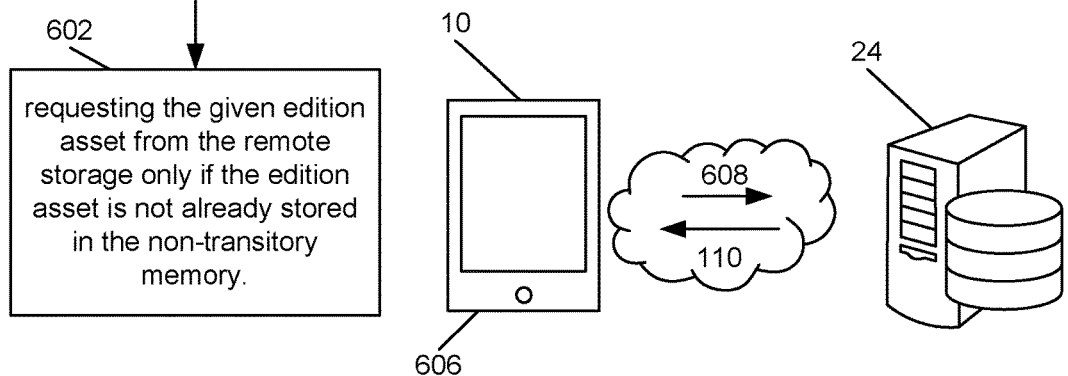
FIG. 6B

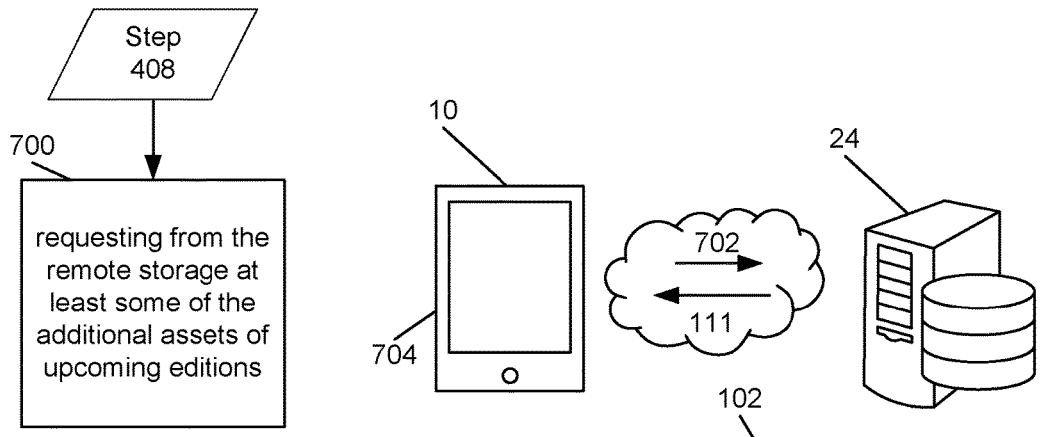
FIG. 7
FIG. 7A
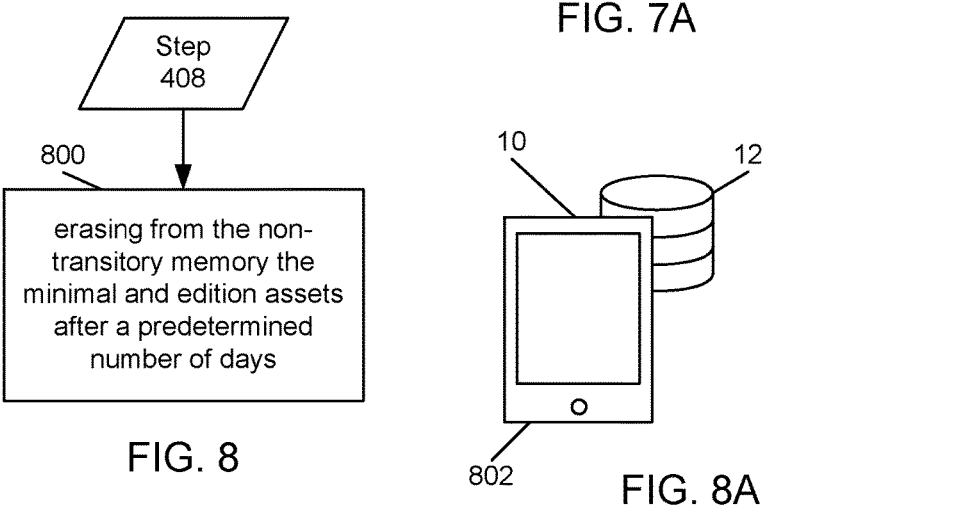
FIG. 8
FIG. 8A

DEVICE, METHOD AND SYSTEM FOR DISPLAYING A FIRST PAGE OF A DIGITAL EDITION BY EFFICIENT DOWNLOAD OF ASSETS

CROSS-REFERENCE TO RELATED APPLICATIONS

The present application is the national phase of International Application No. PCT/CA2014/050014, entitled "DEVICE, METHOD AND SYSTEM FOR DISPLAYING DIGITAL EDITIONS", filed on Jan. 10, 2014, and claims priority to U.S. Provisional App. Ser. No. 61/751,518, filed Jan. 11, 2013, both of which are incorporated herein by reference in their entirety.

FIELD OF THE INVENTION

The present invention relates to systems and methods for downloading and displaying digital editions, such as newspapers or magazines, on an electronic device. More particularly, the present invention relates to an improved system and a method of downloading a digital edition.

BACKGROUND

Digital editions of magazines and newspapers have become extremely popular in recent years with the advent of intelligent tablets, such as Apple's iPad™, Google's Nexus™, or Microsoft's Surface™. Consequently, print publishers feel a growing need to offer a digital version of their publications, which have traditionally only been available in printed form.

While many publishers offer a web, on-line version of their publications, this service is often limited by the bandwidth available for use by the user's electronic device, and does not allow for off-line consultation of the complete edition when the device is no longer connected to the internet, such as when on a plane, as but one example. In addition, it is known that many readers consulting news websites merely skim through the headlines, without thoroughly reading the articles themselves.

In addition to websites, some renowned newspapers and magazines offer a downloadable, digital version of their printed edition, which may be consulted either off-line or on-line. Some publishers offer their own application for viewing these publications, such as USAToday™, while other publishers use widely-available programs such as Adobe Viewer™, Zinio™ and Kiosque™, to name a few. There is thus a wide spectrum of applications for tablets, desktops and/or laptops which allow for the downloading and reading of digital editions.

Most digital editions are provided in Adobe™'s pdf format, offering little or no interactivity to the users, in addition to being time-consuming and bulky to download. This may be one of the reasons why tablet users are not embracing digital editions of magazines and newspapers as expected. The Daily™'s newspaper experiment, offering a tablet-only publication (*The Daily*™), ceased after only two years of operation, demonstrating that a viable model for digital newspapers had yet to appear.

One drawback of some existing viewer applications is that they do not allow users to start reading their digital publication unless the publication has been completely downloaded. Another limitation of existing applications is that downloading of the digital publication is made sequentially, according to a preset order, one page after the other. While this standard downloading mode may be suitable for readers of books or movies, which are read or viewed chronologically, it is not always well suited for readers of magazines or newspapers, some of whom may first want to flip through the entire edition before deciding which sections to read thoroughly. In addition, these sections are not necessarily the first sections in the edition.

It is also known that a user's "waiting tolerance" for the download of digital content is only of a few seconds. It is thus a challenge for publishers to deliver digital editions of magazines or newspapers that are both rich in content, interactive, with high-quality images and/or animations, and also which may also be consulted rapidly, without further delaying readers from accessing content of the edition.

U.S. Pat. No. 8,477,331 to WEI et al. relates to an apparatus and a method for creating an electronic version of a printed newspaper or of a magazine. The creation of the electronic version of the newspaper requires scanning the printed newspaper.

U.S. Pat. No. 7,747,970 to SANCHEZ et al. relates to systems and methods for receiving preview content on a mobile device and for displaying more detailed information upon request by the user of the mobile device. The preview content sent to the mobile devices is web-based content which is broadcasted, in contrast with compiled content sent to a dedicated software application.

Also known to the Applicant are U.S. Pat. No. 8,131,093; U.S. Pat. No. 8,209,623; US 2011/0173188; US 2008/0271095 and US 2012/0096094.

Hence, in light of the aforementioned, there is a need for an improved system and method for allowing users to rapidly have access to a digital edition, without sacrificing content size and/or quality of the edition.

SUMMARY OF THE INVENTION

The object of the present invention is to provide a system and a method, which satisfy the above-mentioned need, and is thus an improvement over other related systems and methods known in the prior art.

The present invention is concerned with a processor-implemented method for displaying a digital edition readable by a dedicated software application running on a data processing device having a display screen, even though the digital edition is not completely downloaded on the data processing device. In an embodiment, the method comprises the steps of:
a) receiving a compiled file on the data processing device, the compiled file including:
   a structure of the edition, the structure including a list of sections, and for each of the sections, a list of pages, the pages including text of articles and respective links to edition assets located on a remote storage; and
   a list of minimal assets located on the remote storage and required to open the edition;
b) requesting the minimal assets from the remote storage;
c) receiving the minimal assets on the data processing device and storing the minimal assets received on a non-transitory memory of the data processing device;
d) opening the edition by displaying on the display screen of the processing device a complete predetermined page of the edition including the minimal assets stored in step c); while
e) concurrently requesting from the remote storage the edition assets contained in the remaining pages of the edition according to a downloading sequence, for displaying said remaining pages.

The method is particularly adapted for daily newspaper digital editions readable on electronic tablets.

Optionally, it is possible that in step e), the downloading sequence is interrupted upon receiving an input on the data processing device, the input being associated with a given one of the remaining pages of the edition. In this case, requesting the edition assets of the remaining pages is performed by first requesting edition assets of said given page.

Optionally, the method can comprise the steps of:
i) verifying whether a given edition asset is stored in the non-transitory memory prior to requesting the given edition asset; and
ii) requesting the given edition asset from the remote storage only if the edition asset is not already stored in the non-transitory memory,
the steps i) and ii) being sub-steps performed during steps b) and e).

Optionally, the compiled file further comprises links to additional assets of upcoming editions. In this case, the method can comprise a step f) of requesting from the remote storage at least some of the additional assets of upcoming editions, this step being performed after step e).

Optionally, the minimal and edition assets are stored in the non-transitory memory of the device for a predetermined number of days. In this case, the method further comprises a step of erasing from the non-transitory memory the minimal and edition assets after the predetermined number of days elapses.

Optionally, the method can include a step of displaying an alert message when the size of the edition assets exceeds available storage capacity of the non-transitory memory.

Optionally, the minimal and edition assets are associated with a display capacity of the data processing device, and the method includes a step of requesting a given minimal or edition asset based on the display capacity of the data processing device.

Optionally, the method includes the steps of:
i. receiving a kiosk file, including images of available digital editions;
ii. displaying a list or images of available digital editions;
iii. receiving an input on the data processing device, the input including a selected one of the available digital editions; and
iv. requesting the compiled file associated to the digital edition selected in step iii; steps i) to iv) being performed prior to step a).

According to another aspect of the invention, a data processing device for displaying a digital edition is provided. The digital edition is readable by a dedicated software application running on the data processing device, even though the digital edition is not completely downloaded on the data processing device. The data processing device includes:
a communication port and a processor for receiving a compiled file;
a non-transitory memory connected to the processor for storing the compiled file, the compiled file including:
a structure of the edition, the structure including a list of sections, and for each of the sections, a list of pages, the pages including text of articles and respective links to edition assets located on the remote storage; and
a list of minimal assets located on a remote storage and required to open the edition, said minimal and edition assets comprising images;
a display screen for displaying the digital edition.

The processor includes means for requesting the minimal assets from the remote storage; means for receiving the minimal assets on the data processing device and for storing the minimal assets received on the non-transitory memory; means for opening the edition by displaying on the display screen a predetermined page of the edition including said minimal assets; and means for requesting from the remote storage the edition assets contained in remaining pages of the edition according to a downloading sequence and for concurrently displaying said remaining pages. These means can be for example processor-readable instructions stored in the memory of the device and readable by its processor.

In an embodiment, the data processing device includes input means for receiving an input associated with a given one of the remaining pages of the edition, and means for first requesting edition assets of said given one page.

Optionally, the device includes means for verifying whether a given edition asset is stored in the non-transitory memory; and means for requesting the given edition asset from the remote storage only if the edition asset is not already stored in the non-transitory memory.

Optionally, the compiled file stored in the non-transitory memory comprises links to additional assets of upcoming editions, and the data processing device comprises means for requesting from the remote storage at least some of the additional assets of upcoming editions.

Optionally, the device comprises means for freeing the non-transitory memory of the minimal and edition assets after a predetermined number of days.

Optionally, the device comprises means for displaying an alert message when the size of the edition assets exceeds available storage capacity of the non-transitory memory of the processing device.

Optionally, the device comprises means for requesting the minimal and/or editions assets compatible with a capacity of the data processing device.

Optionally, the non-transitory memory has stored thereon a kiosk file including images or a list of available editions. The data processing device comprises means for displaying on the display screen the images of available digital editions; means for detecting from an input of the processing device a selected one of the available digital editions; and means for requesting the compiled file associated to the digital edition selected.

According to another aspect of the invention, a back-end system is provided. The back-end system is for generating a compiled file for displaying a digital edition readable by a dedicated software application running on a data processing device, even though the digital edition is not completely downloaded on the data processing device. The back-end system includes an assembler system comprising:
means for creating a structure of the edition, the structure including a list of sections, and for each of the sections, a list of the pages, the pages including text of articles and respective links to minimal and edition assets. The minimal assets are associated to a predetermined page of the list of pages, for opening the edition. The edition assets are associated with remaining pages of the list of pages;
means for associating said minimal or edition assets with an asset identifier;
means for packaging a compiled file including said structure; and
a distribution system in communication with the assembler system, for sending the compiled file to remote processing devices upon receiving requests from said processing devices.

Optionally, the distribution system comprises means for creating a kiosk file including a list of available digital edition, and respective images associated with each of the available editions.

Optionally, the means for creating a structure of an edition are for creating a digital edition, and wherein a size of the edition assets is over 5 Megabytes.

The objects, advantages and other features of the present invention will become more apparent upon reading of the following non-restrictive description of preferred embodiments thereof, given for the purpose of exemplification only, with reference to the accompanying drawings.

BRIEF DESCRIPTION OF THE DRAWINGS

FIG. 3 is a flow diagram of optional steps of a processor-implemented method, according to an embodiment of the invention. FIGS. 3A and 3C are schematic representations of interactions between a processing device and a distribution system. FIG. 3B is a schematic representation of the processing device displaying available digital editions, according to a preferred embodiment of the invention.

FIGS. 4A and 4E are flow diagrams of steps of a processor-implemented method, according to an embodiment. FIGS. 4B to 4D, and 4G are schematic representations of interactions between the processing device and a distribution system and a remote storage.

FIG. 5 is a flow diagram of optional steps of an embodiment of a processor-implemented method. FIG. 5A is a schematic representation of the processing device receiving an input with a selection of a page of the digital edition, according to a preferred embodiment. FIG. 5B is a schematic representation of interactions between the processing device and a remote storage.

FIG. 6 is a flow diagram of optional steps of a processor-implemented method, according to an embodiment of the invention. FIG. 6A is a schematic representation of the processing device, according to a preferred embodiment. FIG. 6B is a schematic representation of interactions between the processing device and a remote storage, according to a preferred embodiment of the invention.

FIG. 7 shows an optional step of a processor-implemented method, according to an embodiment of the invention. FIG. 7A is a schematic representation of the processing device, according to a preferred embodiment of the invention.

FIG. 10A is a schematic representation of the processing device, according to a preferred embodiment of the invention.

DETAILED DESCRIPTION OF PREFERRED EMBODIMENTS

Figure 1:
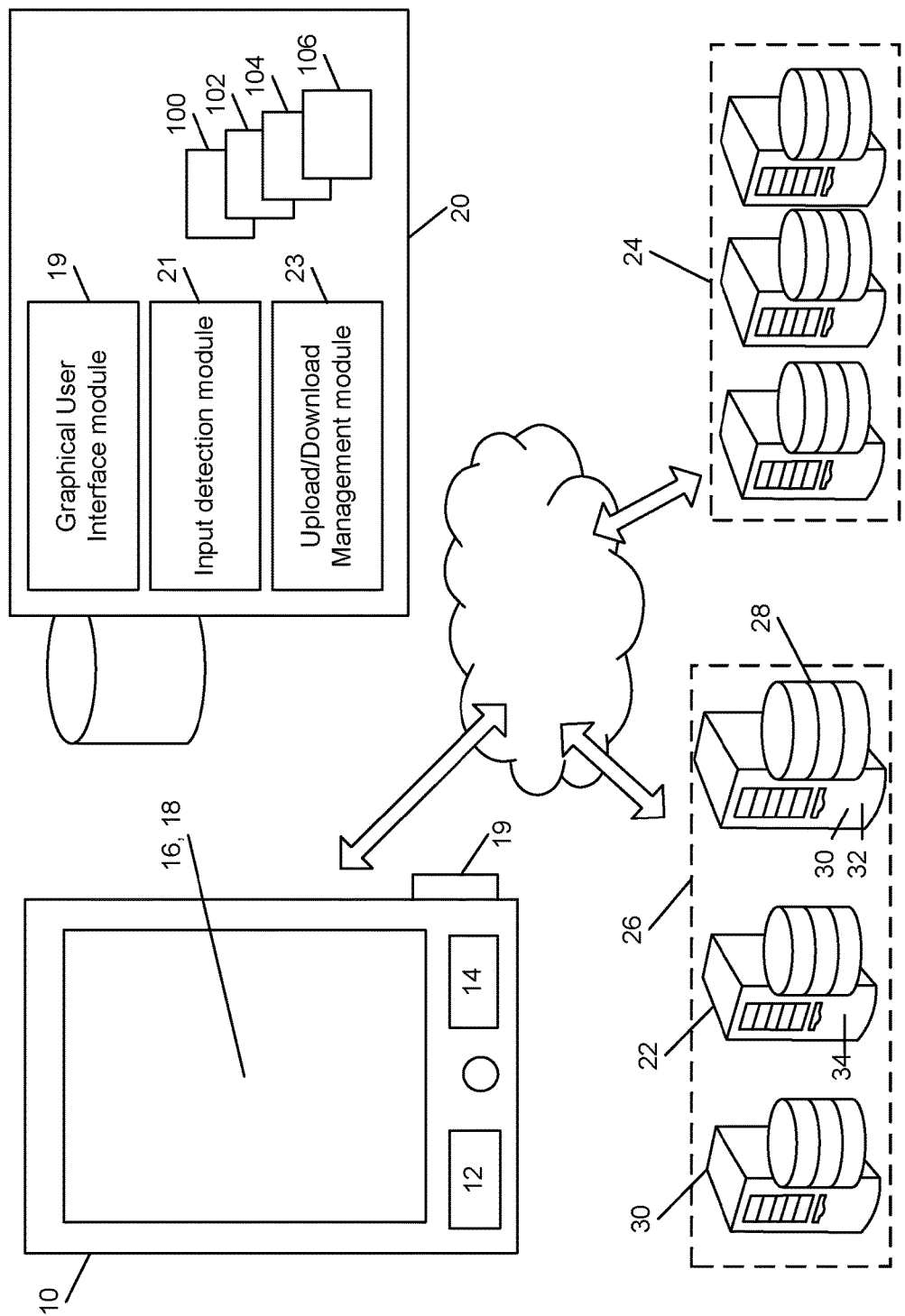
FIG. 1 is a schematic representation of a processing device, a back-end system and a remote storage according to preferred embodiments of the invention, the processing device being shown within its environment.

It is to be understood that certain descriptions of the present invention have been simplified to illustrate only those elements and limitations that are relevant to a clear understanding of the present invention, while eliminating, for purposes of clarity, other elements. Those of ordinary skill in the art, upon considering the present description of the invention, will recognize that other elements and/or limitations may be desirable in order to implement the present invention. However, because such other elements and/or limitations may be readily ascertained by one of ordinary skill upon considering the present description of the invention, and are not necessary for a complete understanding of the present invention, a discussion of such elements and limitations is not provided herein. As such, it is to be understood that the description set forth herein is merely exemplary to the present invention and is not intended to limit the scope of protection.

It is worth mentioning that throughout the following description, when the article "a" is used to introduce an element, it does not have the meaning of "only one" it rather means of "one or more".

Certain terms used in this application and their meanings as used in this context are set forth at the outset for ease of reference. To the extent a term used herein is not defined below, it should be given the broadest definition persons in the pertinent art have given that term as reflected in at least one printed publication or issued patent. Further, the present invention is not limited by the usage of the terms shown below, as all equivalents, synonyms, new developments, and terms or techniques that serve the same or a similar purpose are considered to be within the scope of the present invention.

In the context of the present description, the expressions "digital edition" and "digital publication" may be used interchangeably. While the present invention is suitable for use with the digital edition of a daily newspaper, the term "digital edition" is not limited to such a publication, and can refer to other periodic publications, such as magazines. In the context of the present invention, the "digital edition" refers to a compiled digital file readable by a dedicated software application, and including not only text and images (or graphics), but also complex objects, such as animated advertisements, interactive charts and timelines, access to video streaming, etc. The terms "application", "app" and "program" can be used interchangeably. The use of the term "application" within the present disclosure is intended to refer to a set of instructions stored on a non-transitory memory, and executable by a processor. A "dedicated software application" is intended to refer to an application particularly adapted and configured to process a compiled file according to a specific format.

Moreover, although the present invention was primarily designed for data processing devices such as "electronic tablets", the device, system and method described below can may be used with other kinds of devices, such as the following non-limitative examples: a computer (laptop or desktop), a smartphone, or any other similar device provided with a processor; a memory; means to connect to a network; means to receive input from a user, such as a touchscreen, a keyboard, a mouse and the likes; and a display screen.

As shown in FIG. 1, a data processing device 10 is provided for displaying a digital edition, such as an interactive digital newspaper edition. The processing device 10 is preferably an electronic tablet with a tactile screen 16. The digital edition is readable by a dedicated software application 20 running on the device 10, even though the digital edition is not completely downloaded on the data processing device 10. The data processing device 10 is provided with a communication port 19 and a processor 14 for receiving compiled file(s) related to the digital edition. The device 10 includes a non-transitory memory 12 connected to the processor 14 for storing the compiled file(s). The device 10 also includes a display screen 16 for displaying the digital edition, which is preferably a touchscreen such that it can serve as both a display screen 16 and as an input means 18. The application 20 includes different modules, such as a graphical user interface module 19 to control what is to be displayed, an input detection module 21 to control and manage input commands from a user, and an upload/download management module 23, to send/receive information with remote computers, networks and/or servers.

Figure 2:
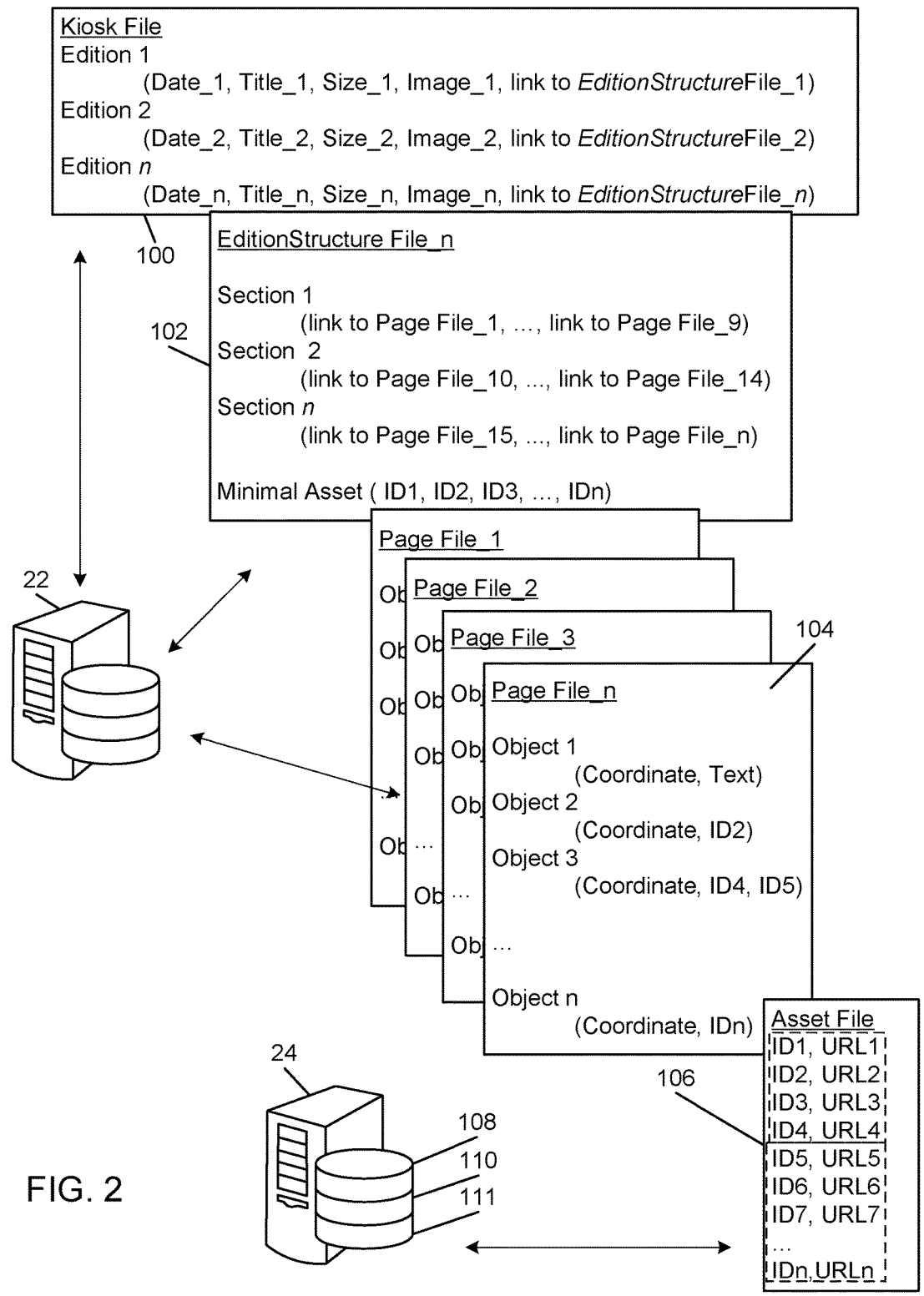
FIG. 2 is a schematic representation of compiled files, according to an embodiment.

Referring to FIG. 2, possible types of compiled files include a "kiosk" file 100, which includes a list of available digital editions, and an "edition structure" file 102, which contains the structure of an edition, such as a list of sections for this edition, and for each of the sections, and a list of pages 104 with respective links 106 to assets stored remotely on a remote storage 24. The compiled files 100, 102, 104, 106 are preferably .JSON (JavaScript Object Notation) format files, although other format types can be considered, such as the proprietary .issue format from Adobe or .XML (Extensible Markup Language). The compiled "edition structure" file 102 also includes a list of minimal assets 108 (for example, with ID1 to ID4) located on the remote storage 24. The minimal assets 108 are assets which are required for the processing device to open the edition and display one page of the edition. As can be appreciated, the "edition structure" file 102 does not include the entire content of the digital edition.

Referring to FIGS. 1 and 2, a back-end system 26 for generating the compiled file 102 of the structure of the digital newspaper, and other files 100, 104, 106 is provided. The back-end system 26 includes an assembler system 28. The assembler system 28, which preferably consists in one or several servers, includes means 30 for creating the structure of the edition as described above. The back-end system 26 also includes means 32 to package the compiled file, with page and asset files. The means 30, 32 include parsing and compiling modules, and possibly a compressing module. The back-end system also includes a distribution system 22, such as one or several servers, in communication with the assembler system 28, for sending the compiled file(s) to the remote processing devices 10 upon receiving requests from the devices 10. Preferably, it is the distribution system 22 that is provided with means 34 to create the kiosk file. The back-end system 26 also includes an editing system 30, allowing creating the layout of pages of the edition. The editing system 30 is in communication with the assembler system 28. Of course, the distribution, assembler and edition systems 22, 28, 30 can be distributed in different physical locations, and each system can also be distributed among different servers, in the same location or in different locations. It is possible for the back-end system to be configured as a "cloud" system. Communications between the processing device 10 and the remote servers 22, 24 are made through web services, which preferably run on the servers 22, 24. Alternatively, a desktop application can be used to generate the edition files, as long as the files generated are eventually stored and available for access from a server.

Still referring to FIG. 1, the dedicated software application 20 (also referred to as an "app") for downloading and consulting the digital edition must first be installed on the data processing device 10. The application 20 consists in different modules or functions including a set of instructions stored in the non-transitory memory 12, executable by the processor 14 of the device. Once the application is installed on the device 10, the processor can execute instructions to request, or "pull", from a remote distribution server 22, compiled file(s), such as the "kiosk" file or the "edition structure" file. Of course, in other embodiments, it can be considered to push or send the kiosk file from the remote server 22 to the data processing device 10. The remote server 22 can be for example a Distributed Access Control System (DACS). The remote server 24 can include one or multiple servers located in the same or in different physical locations. The distribution server 22 comprises distribution software, and its function is to send the compiled kiosk or edition files to the tablets 10 when requested. Preferably, the "edition structure" file is compressed, using for example a .zip format.

Referring to FIGS. 3 and 3A to 3C, optional steps of the method are illustrated. In the case where the digital edition is a daily newspaper, a kiosk file 100 is preferably sent to the device 10, prior to sending the "edition structure" compiled file. The processing device 10 therefore receives the kiosk file (step 300), including images of available digital editions. The processing device displays a list or images of available digital editions on the display screen (step 302) and receives an input from the reader including a selected one of the available digital editions (step 304). The list of available editions is displayed in a graphical user interface, as shown in FIG. 3B. From this interface, which can be referred to as a "vitrine", the reader can select one of the available editions, which is typically the latest digital edition available, using the touch screen. The processing device 10 thus receives an input consisting of the selection made by the reader, and then requests the compiled file associated to the digital edition selected, such as with a request message 114. To perform the steps 300 to 306 described above, the data processing device includes means 308 for receiving the kiosk file, means 310 for displaying on the display screen the images of available digital editions, means 312 for detecting from an input of the processing device a selected one of the available digital editions, means 314 for requesting the compiled file associated to the digital edition selected. Such means includes processor-readable instructions stored in the non-transitory memory of the device as well as hardware elements such as a communication port on the device 10, the display screen 16 and input means such as a touchscreen, a keyboard, a microphone or any other possible means allowing capturing the selection made by a reader.

Referring to FIG. 2, an exemplary embodiment of a kiosk file will be described in more detail. The kiosk file 100 is a compiled file (or data structure) which comprises the list of digital editions available for display. For each available edition, the kiosk file 100 includes information related to the respective editions, such as the date of the edition, its title (for example, the "Monday" edition), its size when completely downloaded (varying for example between 5 to 200 Megabytes), an image representative of the edition (such as an image of the front page), and a link (or address), such as a URL (Uniform Resource Locator) address, which points to a compiled file associated to the edition, stored on the remote server. Preferably, the kiosk file 100 uses the JSON (Java Script Object Notation) format, although other compiled formats can be used, such as the XML (Extensible Markup Language) for example. While in the context of periodic editions, it is preferable to present readers with available editions via a kiosk, it is possible to implement the present method without using the kiosk file and related process steps.

Referring to FIGS. 4A to 4D, the data processing device 10 receives a compiled file (step 400), which corresponds to an "edition structure" file 102. If the optional steps explained in the previous paragraph have been conducted, the "edition structure" file corresponds to the digital edition selected by the user. While the "edition structure" file is preferably requested by the processing device 10, it is also possible for the distribution server 22 to push the compiled file to the device 10. As mentioned previously, the compiled file includes the structure of the edition, and the structure includes a list of sections; each including a list of pages with respective links to edition assets located on the remote storage 24. The compiled file 102 also includes a list of minimal assets located on a remote storage and required to open the edition.

Referring to FIG. 2, an exemplary embodiment of a compiled file 102 associated to the structure of the edition will be described in more detail. Similar to the kiosk file 100, the compiled file associated to a specific edition is preferably in a JSON format, although other formats are possible. This compiled file 102, which is referred as the "main" or "edition structure" file, comprises the structure or the arrangement of the digital edition. The main file includes a list of sections of the edition, and for each of the sections, a list of links to pages of the section. Each page file 104 in turn includes information relating to the objects to be displayed in the page, including text, images, timelines, charts, videos or links to videos, animations, etc. The page file 104 provides the layout information of the page, with coordinate information for each object to be displayed in the page. An "object" can consist of text, of a single asset, or of several assets. An "asset" can be an image file, a video file or a link to a video file, an audio file, a pdf file, and the like. For example, the object "photo gallery" can comprise 10 different images, each image being an "asset" or a "resource". Preferably, an asset file stores asset identifiers and their location, which can be on a remote storage 24, in the case the asset has not been previously downloaded on the processing device 10, or in the non-transitory memory of the processing device, in the case the asset has been previously downloaded. The assets are associated with respective identifiers, allowing the processing device to track whether or not a given asset has already been downloaded. The minimal and edition assets 108, 110 are not part of the edition structure file 102, but they are stored remotely, on the remote storage server 24, such as a Content Delivery Network (CDN). A CDN typically consists of a distributed system of servers located in several data centers.

Preferably, text of the complete edition is included in the "main" compiled file, or the "edition structure" file, since text data is not "heavy" in terms of bytes. The content of the edition which is more demanding in terms of download time is stored remotely, on high availability, high performance storing servers 24. Since the compiled file of the edition is generated from a backend system, the list of minimal elements to open the edition can be modified and/or adapted, without having to modify the dedicated application.

Back to FIGS. 4A to 4D, once the processing device has received the compiled file of the structure of the edition from the distribution server 22, the processing device 10 requests the minimal assets from the remote storage 24 (step 402), such as by sending a request message 116. The processing device receives the minimal assets 108, and stores them on its non-transitory memory 12 (step 404).

Figure 4F:
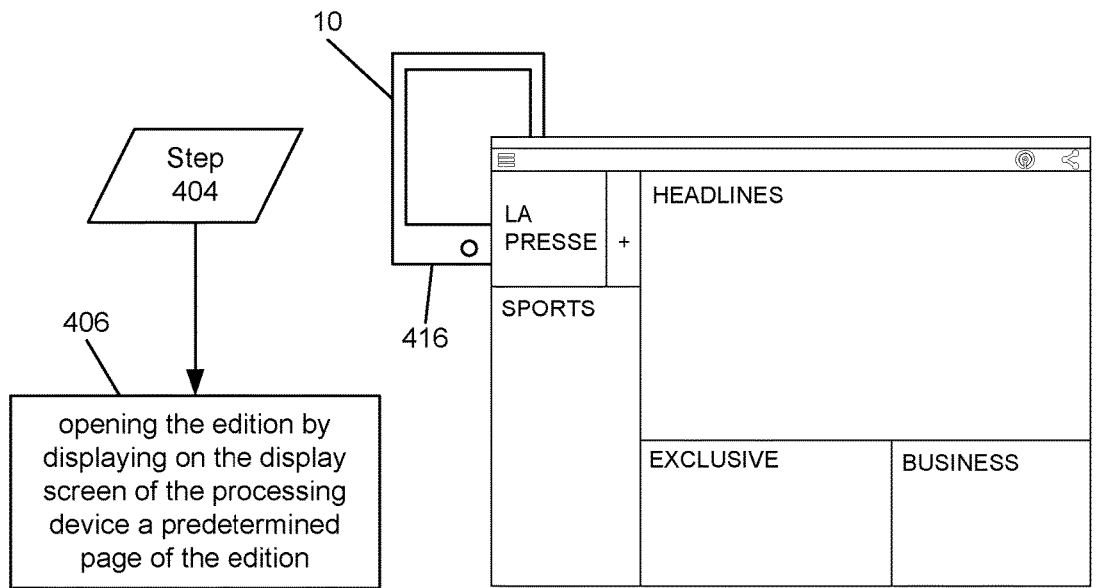
FIG. 4F is a schematic representation of the processing device displaying a predetermined page of the edition, according to a preferred embodiment of the invention.
Figure 4E:
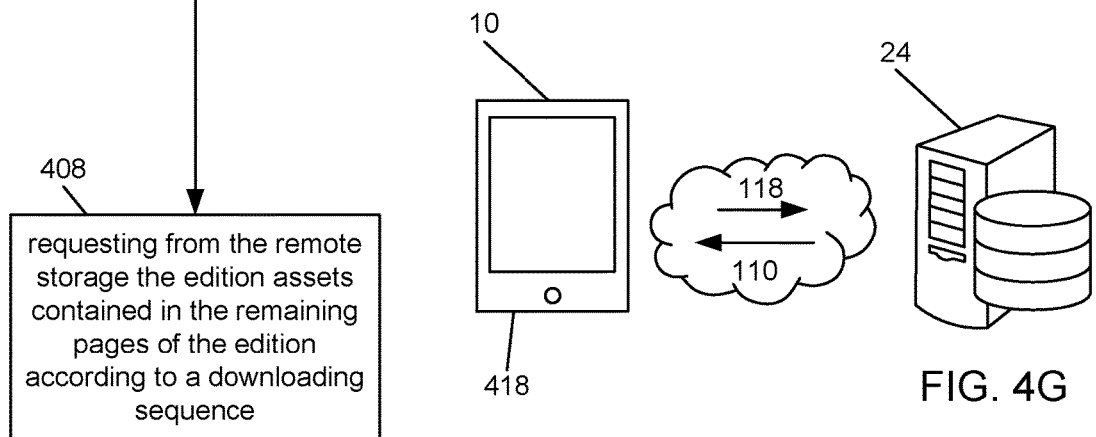

Referring now to FIGS. 4E to 4G, once the minimal assets are stored, the processing device 10 opens the edition by displaying on the display screen a predetermined page 410 of the edition, which includes the minimal assets 108 (step 406). As can be appreciated, the reader can start reading a page of the edition, typically the front page, while the processing device 10 requests from the remote storage the edition assets contained in the remaining pages of the edition according to a downloading sequence, for displaying said remaining pages (step 408). The device 10 is thus able to display a portion of the edition to the reader, even though the complete edition has not been fully downloaded. The present method and processing device 10 therefore advantageously allows readers to start reading their newspaper within a few seconds of having selected it, without having to wait for the complete edition to be downloaded. The present method and device thus offers advantages over prior art, which typically require the complete digital edition to be downloaded in order to be able to open it.

Referring to FIGS. 4A to 4G, in order to be able to perform the method described above, the processing device is provided with means 410 for receiving the compiled file, and means 412 for requesting the minimal assets from the remote storage. Such means includes the communication port and processor-readable instructions, stored in the memory of the processing device, to read the minimal asset address, establish communication with the remote server 24 and request the asset stored thereon. The processing device 10 also includes means 414 for receiving the minimal assets, such as the communication port, and processor-readable instructions, stored in the memory of the processing device, to detect the minimal asset received, and to store the assets in the non-transitory memory. The processing device also includes means 416 for opening the edition by displaying on the display screen a predetermined page of the edition including said minimal assets. Such means can include processor-readable instructions, stored in the memory of the processing device, to read the layout information of the predetermined page, and display on the display screen the text and minimal assets at the proper location on the display screen for said page. Finally, the processing device must also include means 418 for requesting from the remote storage the edition assets contained in the remaining pages of the edition. Such means also include the communication port, and processor-readable instructions, stored in the memory of the processing device, to read the address links of the assets of other pages of the edition, and request them from the remote storage 24. The processing device uses means 414 to receive the edition assets 110 from the remote storage 24.

If the user does not interact with the device, or in other words, if the processing device does not receive any input from the tactile screen, from a keyboard or other type of input means, download of the edition assets of the remaining pages of the edition is made according to a predetermined downloading sequence. This predetermined sequence does not need be continuous. For example, the first pages of each section of the edition can first be downloaded, rather than downloading each page of the edition along a continuous, sequential order. Advantageously, downloading the front page of each section first provides readers with the impression that all sections are available for reading, while the edition has not yet been fully downloaded.

The predetermined downloading sequence can also be modified according to the behavior of the tablet owner. Such behavior can be monitored and registered over a given period of time, establishing a behavior profile for a given user. For example, in the case of a newspaper edition, if a reader always starts reading the sports section, the predetermined download sequence can be adapted so as to first download the sports section prior to any other sections of the edition. In another possible example, to the viewing behavior of a pool of the first 1,000 readers who have read the current newspaper edition can be monitored and registered. This monitoring permits tracking of the most viewed pages by these readers. It thus becomes possible to modify the downloading sequence of the current edition for the next pool of readers based on previous downloads of the same edition. The predetermined downloading sequence of the digital edition can be stored locally on the tablet or sent though the .JSON file of the edition.

With reference to FIG. 5, it is also possible for a user to flip to another section of the edition, which has yet to be downloaded. The downloading sequence is interrupted upon receiving an input on the data processing device, the input being associated with a given one of the remaining pages of the edition, not yet downloaded (step 500). In this case, the step of requesting the edition assets of the remaining pages is performed by first requesting edition assets of the given one page selected (step 502). The processor will stop, or interrupt the predetermined download sequence for the remaining portion of the digital edition and request the assets of the page selected by the user. To perform these steps, the processing device requires input means, preferably the tactile display screen, for receiving the input associated another page of the edition, and means 504 for first requesting edition assets 110i of said given one page. Such means 504 can include the communication port and processor-readable instructions, stored in the memory of the processing device.

The processor will immediately modify the downloading sequence of the remaining pages of the edition based upon the selected page. Once all assets of the required page are downloaded and cached in the non-transitory memory, the processor will display the page on the display screen, and will preferably continue downloading the edition from this selected page. Of course, by "selecting a page", it can also be understood that a link to a page is selected, rather than the page itself, via an index or a link for example. The selection of a page can also be made by simply swiping the digital pages of the edition via a touch screen. Advantageously, the present application allows for readers to flip through different sections of the digital editions, while experiencing a minimal, if any waiting time, since the downloading of the digital edition adapts in response to the pages selected by the reader.

Referring now to FIG. 6, another aspect of the application will be described. As it can be understood by a person skilled in the art, the same asset (picture, widget, animation, etc.) can appear several times within the same digital edition. In order to minimize the time required to download content of the edition, the .JSON file of the edition preferably includes, for each asset, an asset identifier (or asset ID) and an asset address (which is preferably a URL). When the device downloads assets of a digital edition from the CDN, these assets are stored locally, in the tablet's non-transitory memory. The processing device also updates a list of downloaded assets, using the IDs of the assets. Using this list, the application is able to verify, prior to downloading an asset, whether said given asset is already stored within the database (step 600), such as by comparing the ID of the asset to download with the list of IDs of assets already downloaded and stored within the cache of the tablet. As a result, and advantageously, each asset of an edition need only be downloaded once, even if an asset appears several times within an edition. In addition, the application will update the asset address so as to point to the non-transitory memory, rather than to the URL of the remote CDN server. In some embodiments, the list of downloaded assets for all of the editions present in the kiosk or "vitrine" are maintained and updated. As such, if a given asset is to appear several times in separate editions which are published over a given period of time, the application will download and cache this asset only once, thus advantageously avoiding having to re-download the same object several times. The processing device therefore verifies whether a given edition asset is stored in the non-transitory memory prior to requesting said given edition asset (step 600); and requests it from the remote storage 24 only if the edition asset is not already stored in the non-transitory memory 12 (step 602). Steps 600 and 602 are thus sub-steps of steps 402 and 404. To perform the method, the processing device thus includes means 604 for verifying whether a given edition asset is stored in the non-transitory memory, and means 606 for requesting the given edition asset from the remote storage only if the edition asset is not already stored in the non-transitory memory, such as explained above. Means 604 includes processor-readable instructions stored in the non-transitory memory 12 of the device. Means 606 includes processor-readable instructions stored in the non-transitory memory 12 of the device, and well as the communication port of the device 10 to send a request message 608.

For example, if an advertisement animation is to be shown each day during a week within each daily digital edition, the processing device will download the animation only once, for the first edition of the week, and will point to the stored asset within its local storage (or memory) when having to display the animation in the editions of the following days. As it can be appreciated, this process reduces the number of assets to download for the subsequent days of the week, which in turn reduces the waiting time for a reader to read their digital newspaper. It also reduces bandwidth requirements and less space is used on the local storage of the device.

Now referring to FIG. 7, another aspect of the processing device and method will be described. In the context of periodic digital editions such as newspapers and magazines, one can understand that not all editions have the same "weight", in terms of kilobytes. In the case of newspapers, Saturday editions are generally more voluminous, with more sections, including special sections with high resolution photo reports, while Sunday editions are lighter, with only a few sections. It is also frequent that some of the sections of the Saturday editions are ready a few days in advance. For example, sections dealing with subjects not related to current news or events, such as the Travel or Car sections, are generally ready by the Wednesday proceeding the Saturday on which the edition is scheduled to be published. The present system takes advantages of this situation, by including within lighter edition files (for example, a .JSON file), information on upcoming editions which is ready for download. The "edition structure" compiled file thus further includes links to additional assets 111 of upcoming editions, the processing device requesting from the remote storage at least some of the additional assets of upcoming editions (step 700). The processing device includes means 704 for requesting from the remote storage the additional assets of upcoming editions. Such means includes the communication port, and processor-readable instructions stored on the non-transitory memory of the device. This can occur for example when the size of the edition assets associated with the current edition is less than a given threshold, the threshold preferably corresponding to a number of megabytes. Similarly, it is possible for the "edition structure" compiled file to include links to additional assets 111 of upcoming editions, when the weight/size of the assets of the upcoming editions is above a given threshold. It can also be decided that each time an edition has been completely downloaded and displayed on the device, assets of upcoming editions are systematically downloaded to take advantage of the available download bandwidth of the device. The decision to download additional assets of upcoming editions can also be based on the type of the edition. For example, once the Friday edition has been completely downloaded, at least some assets of the Saturday edition are downloaded on the device. It should be noted that although FIG. 7A shows that the additional assets are listed in the EditionStructureFile, it is possible to include the list additional assets in a distinct file, which is linked to the EditionStructureFile.

As shown in FIG. 7A, one way to implement such method is to include within the compiled file 102 of the edition structure, a field or section with links to additional assets 111 which will be included in future editions. The processing device is configured to monitor the network and bandwidth availability of the device, and if favorable conditions are met, the processing device downloads from the remote storage 24, these additional assets of upcoming editions, and stores them within the memory of the device. A "favorable condition" can be for example once the current edition has been downloaded. The application then updates the list of downloaded assets, so that when downloading said upcoming editions, the application, upon verifying within the list of downloaded assets, will point to the memory of the device for displaying said asset rather than downloading it from the remote storage server. This operation is not noticed by the user and provides the advantage of further decreasing the waiting time for displaying a digital edition. The system and method is particularly suitable for advertisements which are intended to be part of a later edition, and which can be pre-loaded because the links to their content are included in an earlier digital edition file, which is less voluminous than the later edition. The application is configured to determine when these "additional" assets are to be downloaded, for example after completing the download of all of the assets of current edition, or at night, when access to network bandwidth is less in demand.

Figure 8:
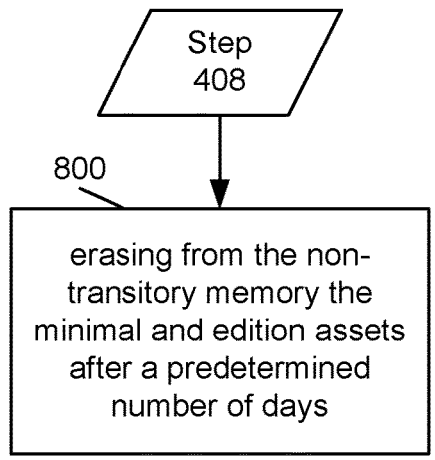
FIG. 8 shows an optional step of a processor-implemented method, according to an embodiment of the invention.
Figure 8A:
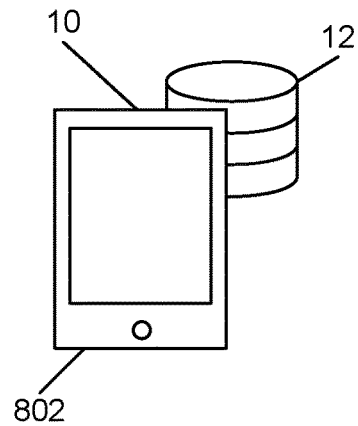
FIG. 8A is a schematic representation of the processing device, according to a preferred embodiment of the invention.
Figure 9:
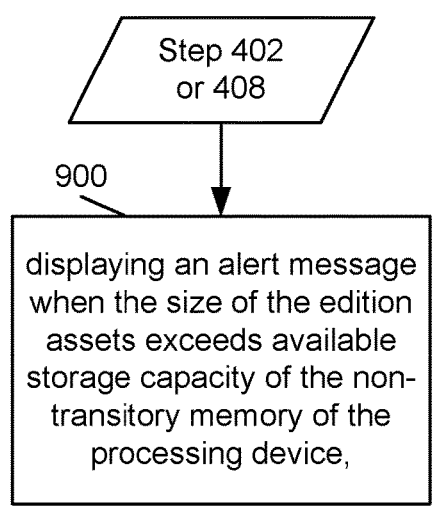
FIG. 9 shows an optional step of a processor-implemented method, according to an embodiment of the invention.
Figure 9A:
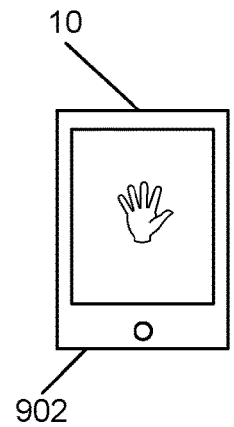
FIG. 9A is a schematic representation of the processing device, according to a preferred embodiment of the invention.

Now referring to FIG. 8, other aspects of the processing device and method will be described. Once the minimal and edition assets have been downloaded from the remote server 24, these assets are stored in the non-transitory memory for a predetermined number of days. Preferably, the processing device erases the non-transitory memory (or "frees" the non-transitory memory) of the minimal and edition assets after said predetermined number of days. This step of course ensures that the non-transitory memory is not overloaded after downloading a few digital editions. To perform this verification, the processing device is provided with means 802, such as a counter or other possible tool, to keep track of the number of days passed since a digital edition file has been downloaded. As shown in FIG. 9, the processing device preferably displays on the display screen an alert message when the size of the edition assets exceeds available storage capacity of the non-transitory memory of the processing device, before requesting the assets, the processing device comprises means to compare the available storage capacity of the non-transitory memory with the overall size of the edition assets, and means to display the alert on the display screen.

Figure 10:
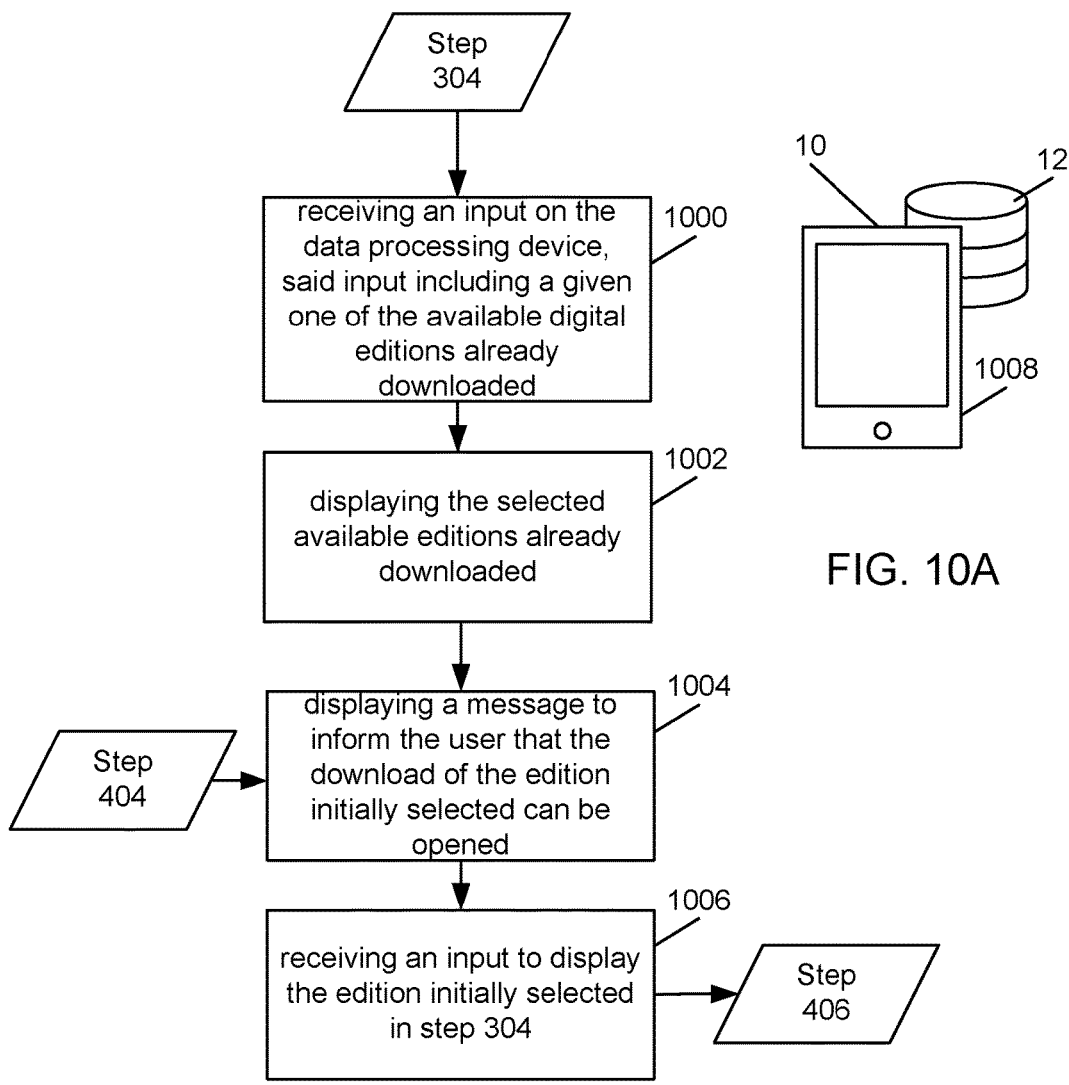
FIG. 10 shows optional steps of a processor-implemented method, according to an embodiment of the invention.

Referring to FIG. 10, it is possible for the processing device 10 to display one of the digital editions of the kiosk already downloaded while performing some of the steps described in FIGS. 3 and 4. For example, a user may wish to read yesterday's edition while todays' edition is being downloaded. In this case, after having received a selection of an edition to be downloaded (ie after step 304), the processing device receives an input including a selection of another digital edition which is already downloaded on the processing device (step 1000). The processing device 10 opens and displays pages of this other digital edition (step 1002), while downloading the minimal assets of the edition initially selected. Once the minimal assets from the edition initially selected are received (step 404), the digital processing device displays a message informing the user that the edition initially selected can be opened (step 1004). The user can than decide to continue reading the edition currently displayed on the device, or switch to the edition initially selected which is now available for reading. In the latter case, the processing device 10 receives an input to display the edition initially selected in step 304, and proceeds with step 406 of the method. To perform these steps, the processing device is provided with means to receive inputs of steps 1000, 1006 (such as through the tactile display screen, a keyboard, a digital pen, and the likes), means to display the edition (ie the display screen), means 1008 to generate a message to the user (step 1004).

Figure 11:
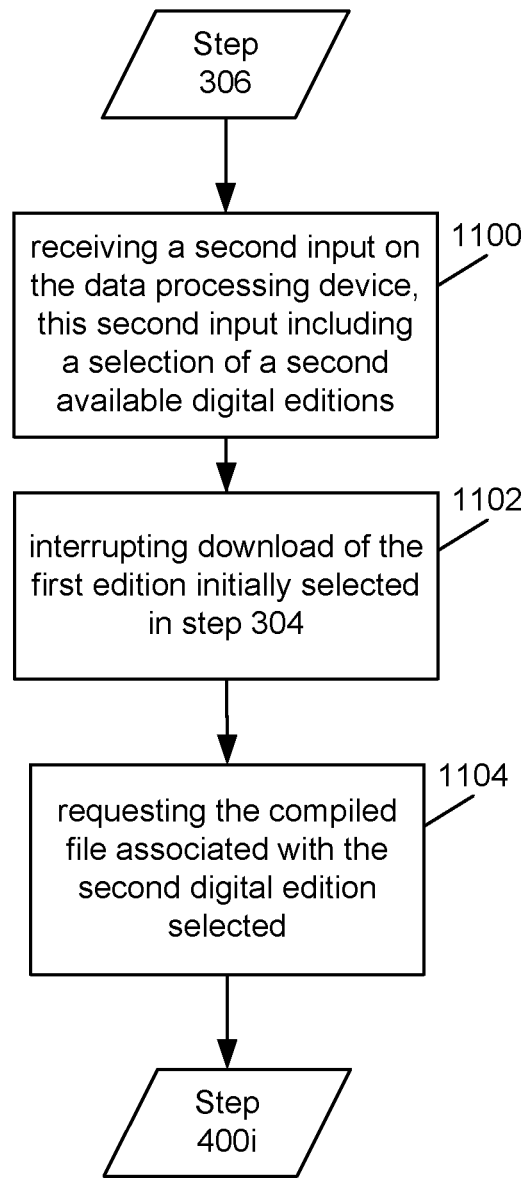
FIG. 11 shows optional steps of a processor-implemented method, according to an embodiment of the invention.

Referring to FIG. 11, it is possible for a user to select a first edition to download, to change its mind and decide that he wants to download a second edition instead. In this case, the processing device receives an input including a selection of a second digital edition (step 1100). The device then interrupts the download of the assets/files of the first editions and requests the compiled file associated to the second digital editions. The following steps (400i, etc.) are then similar to steps 400 to 408. Once the second digital edition is completely downloaded on the processing device, it can then continue downloading the assets/files of the first digital edition initially selected.

It is possible to associate the minimal and/or edition assets with a capacity of the data processing devices. For example, some processing devices are provided with display screens which allow displaying images with a resolution greater than the resolution of other devices. In this case, the processor device can be provided with means to determine capacity of the device, such as the resolution of the display screen, and with means for requesting a given asset based on the capacity of the data processing device. In this case, it is possible to associate a given asset with two different address links, the processing device selecting the appropriate links based on a capacity of the processor or of the display screen.

As can be appreciated, the present invention is an improvement and presents several advantages over existing viewers and methods known in the prior art. Namely, the present invention may be used for any type of digital edition, while being particularly suitable for daily newspapers.

The present invention advantageously allows reducing the "waiting time" experienced by readers when downloading a digital edition on their electronic device, be it a desktop, a laptop, an electronic tablet or a smart phone. The present invention also advantageously favors the creation of digital editions as rich and complex as desired/required, since the weight of the edition is no longer what limits users from beginning to consume the content of their publications. In contrast with other available viewers on the market, the entire publication file does not need to be completely downloaded in order to display the publication on the device screen. Pages of the edition become available to the reader as they are being downloaded. In addition, the present invention allows a user to "control" the downloading sequence of the edition they are reading, their input triggering a change in the downloading sequence of the content of the edition. The downloading sequence of the edition can be further adapted, based on information indicative of a reader or of a pool of readers' behavior, for example. Finally, the present invention takes advantage of the unequal weight of editions over a given period, by including content, or links to content of future editions, not yet available for reading, when the bandwidth occupancy of the device allows for it.

While this invention has been particularly shown and described with references to preferred embodiments thereof, it will be understood by those skilled in the art that various changes in form and details may be made therein without departing from the invention.

The invention claimed is:

1. A processor-implemented method for downloading a periodic digital edition over a network, the periodic digital edition being readable by a dedicated software application running on a data processing device having a display screen, and being displayable before the periodic digital edition is completely downloaded on the data processing device, the method comprising:
    a) receiving a compiled file on the data processing device over the network, the compiled file having been generated on a remote server prior to receiving a request from the data processing device, the compiled file comprising:
        a list of minimal assets, the minimal assets corresponding to assets located on a remote storage that are required to display a first complete page of the periodic digital edition, the first complete page of the periodic digital edition having been predetermined by the remote server, the list of minimal assets having been predetermined on the remote server based on the assets that are required to display the first complete page in its entirety;
        a structure of the edition, the structure including a list of sections and, for each of the sections, a list of pages, the pages including text of articles and respective links to edition assets, the edition assets corresponding to assets located on the remote storage that are required to display remaining pages of the periodic digital edition; and
        links to additional assets, the additional assets corresponding to assets required to display pages in an upcoming periodic digital edition;
    wherein the minimal and edition assets comprise images;
    b) reading the list of minimal assets on the data processing device, and based on the reading, the data processing device sending a request to the remote storage for the minimal assets, the data processing device thereby requesting the minimal assets required to display the first complete page of the periodic digital edition as predetermined by the remote server;
    c) receiving the minimal assets on the data processing device and storing the minimal assets received on a non-transitory memory of the data processing device;
    d) opening the periodic digital edition by displaying on the display screen of the processing device the predetermined first complete page of the periodic digital edition, including the text of articles and the minimal assets stored in process c) at the proper location on the display screen for the first complete page;
    e) concurrently requesting from the remote storage the edition assets contained in the remaining pages of the periodic digital edition according to a downloading sequence, for displaying the remaining pages; and
    f) prior to receiving an input on the data processing device to download the upcoming periodic digital edition, reading the links of the additional assets, and based on the reading, when a size of the additional assets is above a given threshold, the data processing device sending a request to the remote storage for at least some of the additional assets, the data processing device thereby requesting assets of the upcoming periodic digital edition.

2. The processor-implemented method according to claim 1, wherein in process e), the downloading sequence is interrupted upon receiving an input on the data processing device, the input being associated with a given one of the remaining pages of the periodic digital edition, and wherein requesting the edition assets of the remaining pages is performed by first requesting edition assets of the given one page.

3. The processor-implemented method according to claim 2, further comprising:
    i. verifying whether a given asset is stored in the non-transitory memory prior to requesting the given asset; and
    ii. requesting the given asset from the remote storage only if the asset is not already stored in the non-transitory memory, wherein
        i) and ii) are sub-processes performed during processes b) and e).

4. The processor-implemented method according to claim 1, wherein the minimal and edition assets are stored in the non-transitory memory for a predetermined number of days, the method further comprising erasing from the non-transitory memory the minimal and edition assets after the predetermined number of days elapses.

5. The processor-implemented method according to claim 1, further comprising:
    displaying an alert message when a size of the edition assets exceeds available storage capacity of the non-transitory memory, before conducting either one of processes b) or e).

6. The processor-implemented method according to claim 1, wherein the minimal and edition assets are associated with a display capacity of the data processing device, the method comprising requesting a given one of the minimal or edition assets based on the display capacity of the data processing device.

7. The processor-implemented method according to claim 1, comprising:
    i. receiving a kiosk file, including images of available digital editions;
    ii. displaying the images of available digital editions;
    iii. receiving an input on the data processing device, the input including a selected one of the available digital editions; and
    iv. requesting the compiled file associated to the digital edition selected in process iii;
the processes i) to iv) being performed prior to process a).

8. The processor-implemented method according to claim 1, wherein in process e), the edition assets comprise video and audio files.

9. A data processing device for downloading a periodic digital edition over a network, the periodic digital edition being readable by a dedicated software application running on the data processing device, and being displayable before the periodic digital edition is completely downloaded on the data processing device, the data processing device comprising:

a communication port and a processor for receiving a compiled file over the network, the compiled file having been generated on a remote server prior to receiving a request from the data processing device;

a non-transitory memory connected to the processor for storing the compiled file, the compiled file comprising:

a list of minimal assets, the minimal assets corresponding to assets located on a remote storage that are required to display a first complete page of the periodic digital edition, the first complete page of the periodic digital edition having been predetermined by the remote server, the list of minimal assets having been predetermined on the remote server based on the assets that are required to display the first complete page in its entirety;

a structure of the edition, the structure including a list of sections and, for each of the sections, a list of pages, the pages including text of articles and respective links to edition assets, the edition assets corresponding to assets located on the remote storage that are required to display remaining pages of the periodic digital edition; and links to additional assets, the additional assets corresponding to assets required to display pages in an upcoming periodic digital edition;

wherein the minimal and edition assets comprise images;

a display screen for displaying the digital edition;

the processor comprising means for reading the list of minimal assets, and based on the reading, requesting the minimal assets from the remote storage, the data processing device thereby requesting the minimal assets required to display the first complete page of the periodic digital edition as predetermined by the remote server;

means for receiving the minimal assets on the data processing device and for storing the minimal assets received on the non-transitory memory;

means for opening the periodic digital edition by displaying on the display screen the predetermined first complete page of the periodic digital edition, including the text of articles and the minimal assets at the proper location on the display screen for the first complete page;

means for requesting from the remote storage the edition assets contained in remaining pages of the edition according to a downloading sequence for displaying the remaining pages, concurrent to displaying the predetermined first complete page on the display screen; and means for reading the links to additional assets and, based on the reading, when a size of the additional assets is above a given threshold, requesting at least some of the additional assets from the remote storage prior to receiving an input on the data processing device to download the upcoming periodic digital edition, the data processing device thereby requesting assets of the upcoming periodic digital edition.

10. The data processing device according to claim 9, the device comprising an input means for receiving an input associated with a given one of the remaining pages of the periodic digital edition, and means for first requesting edition assets of the given one page.

11. The data processing device according to claim 9, the device comprising:

means for verifying whether a given edition asset is stored in the non-transitory memory; and means for requesting the given edition asset from the remote storage only if the edition asset is not already stored in the non-transitory memory.

12. The data processing device according to claim 9, the device comprising means for freeing the non-transitory memory of the minimal and edition assets after a predetermined number of days.

13. The data processing device according to claim 9, the device comprising means for displaying an alert message when the size of the edition assets exceeds available storage capacity of the non-transitory memory of the processing device.

14. The data processing device according to claim 9, the device comprising means for requesting a given one of the minimal or editions assets compatible with a capacity of the data processing device.

15. The data processing device according to claim 9, wherein the non-transitory memory has stored thereon a kiosk file including images of available editions, the data processing device comprising:

means for displaying on the display screen the images of available digital editions;

means for detecting from an input of the processing device a selected one of the available digital editions; and means for requesting the compiled file associated to the digital edition selected.

16. A back-end system for generating a compiled file for downloading a periodic digital edition to a remote data processing device over a network, the periodic digital edition being readable by a dedicated software application running on the remote data processing device, and being displayable before the periodic digital edition is completely downloaded on the remote data processing device, the back-end system comprising:

an assembler system comprising:

means for creating a list of minimal assets, the minimal assets corresponding to assets required to display a first complete page of the periodic digital edition as predetermined by the back-end system, the list of minimal assets having been predetermined by the back-end system based on the assets required to display the first complete page in its entirety;

means for creating a structure of the periodic digital edition, the structure including a list of sections, and for each of the sections, a list of pages, the pages including text of articles and respective links to edition assets, the edition assets corresponding to assets that are required to display remaining pages of the periodic digital edition, the minimal and edition assets comprising images;

means for associating the minimal or edition assets with an asset identifier;

means for packaging a compiled file prior to receiving a request from the remote data processing device, the compiled file including the structure and the list of minimal assets;

means for creating a distinct file prior to receiving a request from the remote data processing device, the distinct file comprising links to additional assets corresponding to assets required to display pages in an upcoming periodic digital edition; and a distribution system in communication with the assembler system, the distribution system comprising means for sending the compiled file to the remote data processing device upon receiving the request from the remote data processing device such that the processing device can read the compiled file and request the minimal assets to open the periodic digital edition by displaying on the display screen of the processing device the predetermined first complete page of the periodic digital edition including the text of articles and the minimal assets at the proper location on the display screen for the first complete page, the distribution system further comprising means for sending the distinct file to the data processing device such that the data processing device can read the distinct file and, based on the reading, request the additional assets prior to receiving an input to download the upcoming periodic digital edition when a size of the additional assets is above a given threshold, the data processing device thereby requesting assets of the upcoming periodic digital edition.

17. The back-end system according to claim 16, wherein the distribution system comprises means for creating a kiosk file including a list of available digital edition, and respective images associated with each of the available editions.

18. The back-end system according to claim 16, wherein the means for creating a structure of an edition are for creating a digital edition, and wherein a size of the edition assets is over 5 Megabytes.

* * * * *